United States Patent
Alakarhu et al.

(10) Patent No.: US 9,473,702 B2
(45) Date of Patent: Oct. 18, 2016

(54) CONTROLLING IMAGE CAPTURE AND/OR CONTROLLING IMAGE PROCESSING

(75) Inventors: Juha Alakarhu, Helsinki (FI); Ossi M. Kalevo, Toijala (FI); Matti S. Hamalainen, Lempaala (FI); Tero Antti Sakari Vuori, Vantaa (FI)

(73) Assignee: Nokia Technologies Oy, Espoo (FI)

(*) Notice: Subject to any disclaimer, the term of this patent is extended or adjusted under 35 U.S.C. 154(b) by 1002 days.

(21) Appl. No.: 13/336,650

(22) Filed: Dec. 23, 2011

(65) Prior Publication Data
US 2013/0162759 A1    Jun. 27, 2013

(51) Int. Cl.
H04N 5/232    (2006.01)
H04N 5/262    (2006.01)
H04N 5/343    (2011.01)
H04N 5/345    (2011.01)

(52) U.S. Cl.
CPC ........ *H04N 5/23245* (2013.01); *H04N 5/2625* (2013.01); *H04N 5/343* (2013.01); *H04N 5/3454* (2013.01)

(58) Field of Classification Search
CPC ........... H04N 5/23245; H04N 5/2625; H04N 5/343; H04N 5/3454
See application file for complete search history.

(56) References Cited

U.S. PATENT DOCUMENTS

| | | | |
|---|---|---|---|
| 6,734,911 B1 | 5/2004 | Lyons | 348/340 |
| 7,965,314 B1* | 6/2011 | Miller et al. | 348/164 |
| 2004/0201677 A1 | 10/2004 | Bronson | 348/207.1 |
| 2007/0040928 A1* | 2/2007 | Jung et al. | 348/362 |
| 2008/0174670 A1 | 7/2008 | Olsen et al. | 348/222.1 |
| 2008/0191127 A1* | 8/2008 | Fine | H04N 5/2254 250/235 |
| 2008/0225130 A1 | 9/2008 | Paaaho et al. | 348/222.1 |
| 2009/0167923 A1 | 7/2009 | Safaee-Rad et al. | 348/345 |
| 2009/0207310 A1 | 8/2009 | Arai | |
| 2009/0225189 A1 | 9/2009 | Morin | 348/229.1 |
| 2010/0053342 A1 | 3/2010 | Hwang et al. | 348/207.99 |
| 2010/0302403 A1 | 12/2010 | Anderson | 348/222.1 |
| 2011/0200259 A1 | 8/2011 | Lindskog et al. | 382/201 |

FOREIGN PATENT DOCUMENTS

| | | |
|---|---|---|
| GB | 2447246 A | 9/2008 |
| WO | WO 2008/136007 A2 | 11/2008 |
| WO | WO 2010/147609 A1 | 12/2010 |
| WO | WO 2010/147609 A1 | 12/2010 |

* cited by examiner

*Primary Examiner* — Tat Chio
(74) *Attorney, Agent, or Firm* — Harrington & Smith (57) ABSTRACT

A method including selecting one or more portions of a scene; controlling an image sensor to capture, at a relatively wide field of view, a wide-field-of-view image of a scene; controlling the image sensor to capture, at a relatively narrow field of view or narrow fields of view, one or more narrow-field-of-view images of the one or more selected portions of the scene.

24 Claims, 3 Drawing Sheets

CONTROLLING IMAGE CAPTURE AND/OR CONTROLLING IMAGE PROCESSING

TECHNOLOGICAL FIELD

Embodiments of the present invention relate to controlling image capture and/or controlling image processing.

BACKGROUND

It is now common practice for images to be captured, stored and displayed as an array of pixels.

A image sensor may have an array of sensor elements each of which is configured to capture a pixel of the image.

As image sensors use increasingly large numbers of sensor elements, the images captured by the image sensor become larger. The transport routes for the images therefore need to have greater bandwidth and increased memory capacity may be required to store the images.

BRIEF SUMMARY

According to various, but not necessarily all, embodiments of the invention there is provided a method comprising: selecting one or more portions of a scene; controlling an image sensor to capture, at a relatively wide field of view, a wide-field-of-view image of the scene; and controlling the image sensor to capture, at a relatively narrow field of view or narrow fields of view, one or more narrow-field-of-view images of the one or more selected portions of the scene.

According to various, but not necessarily all, embodiments of the invention there is provided an apparatus comprising: at least one processor; and at least one memory including computer program code the at least one memory and the computer program code configured to, with the at least one processor, cause the apparatus at least to perform:
  selection of one or more portions of a scene;
  control of an image sensor to capture, at a relatively wide field of view, a wide-field-of-view image of a scene;
  control of the image sensor to capture, at a relatively narrow field of view or narrow fields of view, one or more narrow-field-of-view images of the one or more portions of the scene.

According to various, but not necessarily all, embodiments of the invention there is provided a method comprising: selecting one or more portions of a scene; storing in a memory for subsequent retrieval a wide-field-of-view data structure recording an image of the scene captured at a relatively wide field of view; and storing in a memory for subsequent retrieval one or more narrow-field-of-view data structures recording one or more images restricted to the one or more portions of the scene.

According to various, but not necessarily all, embodiments of the invention there is provided a method comprising: receiving a wide-field-of-view image; receiving one or more narrow-field-of-view images; forming by a processor a composite wide-field-of-view image using the wide-field-of-view image and the one or more narrow-field-of-view images.

BRIEF DESCRIPTION

For a better understanding of various examples of embodiments of the present invention reference will now be made by way of example only to the accompanying drawings in which.

DETAILED DESCRIPTION

FIGS. 1 and 8A to 8D illustrate a method 10 of capturing a wide-field-of-view image 22 of a scene 20 and capturing one or more narrow-field-of-view images 24 of one or more selected portions 26 of the scene 20.

Figure 1:
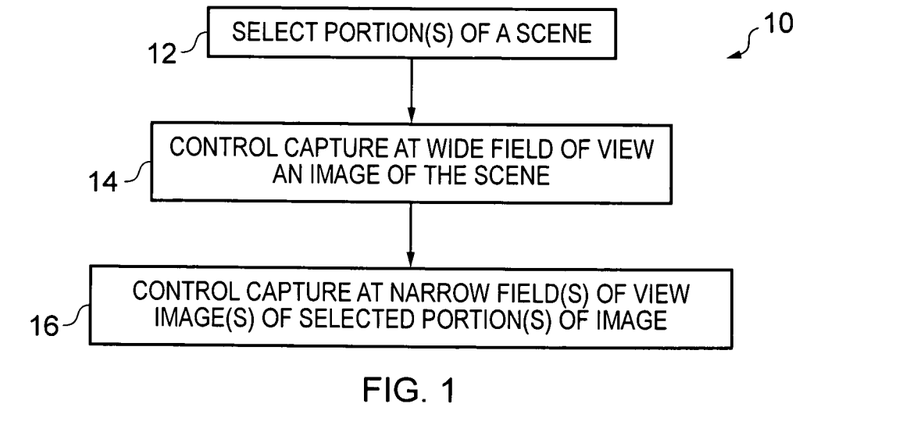
FIG. 1 illustrates an example of a method for capturing a wide-field-of-view image of a scene and capturing one or more narrow-field-of-view images of one or more selected portions of the scene.

Referring to FIG. 1, the Figure illustrates a method 10 comprising: at block 12, selecting one or more portions 26 of a scene 20;

at block 14, controlling an image sensor 3 to capture, at a relatively wide field of view, a wide-field-of-view image 22 of the scene 20; and at block 16, controlling the image sensor 3 to capture, at a relatively narrow field of view or narrow fields of view, one or more narrow-field-of-view images 24 of the one or more selected portions 26 of the scene 20.

As will be described later, the method may be a computerized (computer-implemented) method.

Figure 8A:
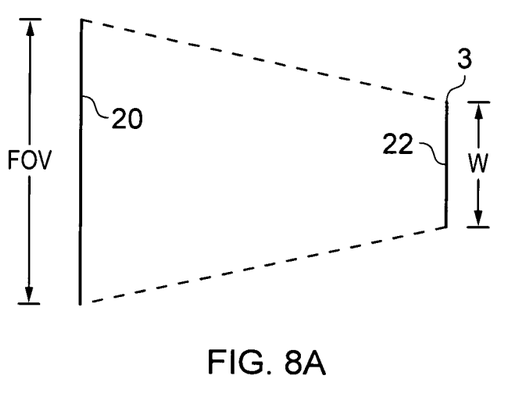
FIG. 8A illustrates capturing a wide-field-of-view image of a scene from a side perspective.
Figure 8B:
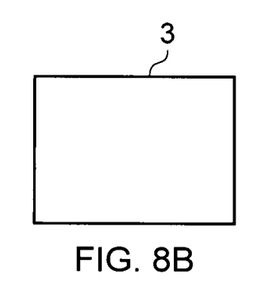
FIG. 8B illustrates capturing a wide-field-of-view image of a scene at an image sensor from a plan perspective.

In FIG. 8A, an image sensor 3 is capturing an image of a scene. A scene is a two dimensional or three dimensional arrangement of photographable elements. The captured image has a wide field of view (FOV), it is a wide field of view image 22. The field of view is that part of the scene 20 that is captured by the image sensor 3. In this example, the whole of the scene 20 is captured by the image sensor 3 and, referring to FIG. 8B, the whole of the image sensor 3 is used to capture the wide field of view image 22.

Figure 8C:
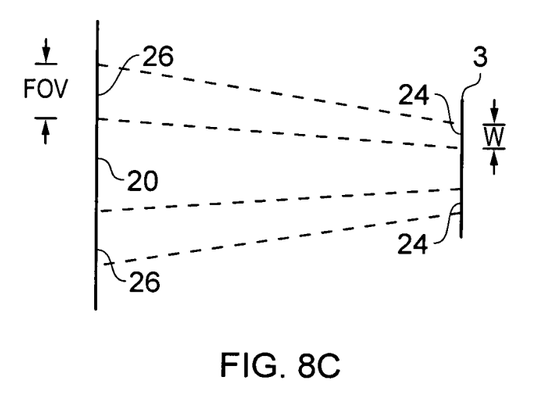
FIG. 8C illustrates capturing multiple narrow-field-of-view images of a scene from a side perspective.
Figure 8D:
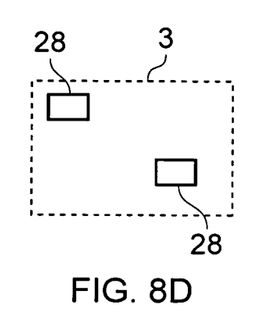
FIG. 8D illustrates capturing simultaneously multiple narrow-field-of-view image of a scene at an image sensor from a plan perspective.

In FIG. 8C, an image sensor 3 is capturing one or more narrow field of view images of the same scene 20. The one or more captured images are narrow field of view images 24. The field of view is that part of the scene 20 that is captured by the image sensor 3. In this example, as illustrated in FIG. 8D, only one distinct portion 26 of the scene 20 is captured by each of one or more sub-sets 28 of the image sensor 3. Each of the one or more sub-sets 28 of the image sensor 3 are used to capture the one or more narrow field of view images 22. The whole of the image sensor 3 is not used. The narrow-field-of-view images 24 are restricted to the one or more portions 26 of the scene 20.

Each of the one or more sub-sets 28 of the image sensor 3 may be distinct and non-overlapping and are used to capture narrow field of view images 22 that are distinct and non-overlapping.

Each of the one or more sub-sets 28 of the image sensor 3 may have a different size, and may be controlled to have a new size. Thus the captured narrow field of view images 22 may have different sizes (different fields of view), and may be controlled to have a new size (field of view).

Selecting one or more portions 26 of a scene 20 may be achieved by selecting one or more sub-sets 28 of the image sensor 3 used to capture one or more narrow field of view images 22. The selection of a sub-set 28 may involve determining a position and a size.

Although the sub-sets 28 illustrated are rectangular, other shapes may be used.

The image sensor 3 may comprise an array of sensor elements. The array may, for example, have M rows and N columns of sensor elements. The image sensor may be used at different spatial resolutions. Spatial resolution for a defined sensor area is the ratio of the number of sensor elements (pixels) used to capture an image in that sensor area to the number of sensor elements (pixels) available to capture that image in that sensor area. Maximum spatial resolution occurs when all the available sensor elements (pixels) in a sensor area are used to capture an image. In this case the operational sensor elements are contiguous. Reduced spatial resolution occurs when all the available sensor elements (pixels) in a sensor area are not used to capture an image. In this case the operational sensor elements are not contiguous but at least some operational sensor elements are separated by non-operational sensor elements.

The image sensor 3 may be operated with a selected spatial resolution to capture, at a relatively wide field of view, a wide-field-of-view image 22 of the scene 20 that has the selected spatial resolution. For example, the image sensor 3 may be operated with a high spatial resolution to capture, at a relatively wide field of view, a wide-field-of-view image 22 of the scene 20 that has a high spatial resolution. Alternatively, the image sensor 3 may be operated with a low spatial resolution to capture, at a relatively wide field of view, a wide-field-of-view image 22 of the scene 20 that has a low spatial resolution.

Likewise, a selected sub-set 28 of the image sensor 3 may be operated with a defined spatial resolution to capture, at a relatively narrow field of view, a narrow-field-of-view image 24 that has the defined spatial resolution.

Referring back to FIG. 1, at block 16, the method 10 may control the image sensor 3 to capture multiple narrow-field-of-view images 24 at different camera settings. The multiple narrow-field-of-view images 24 may be for one portion 26 of the scene 20 or for multiple portions 26 of the scene. The multiple narrow-field-of-view images 24 may be captured simultaneously or sequentially. That is, the narrow-field-of-view images 24 may be distributed over time and/or space.

Different camera settings may, for example, involve a different one or more of: focus setting when the image was captured; spatial resolution of the image (number of pixels); and rate of repeated capture of a narrow-field-of-view image 24 for the same portion 26 of the scene 20.

Camera settings associated with different captured images and their portions can also be associated with the captured image, for example as metadata. The associated camera settings can be integrated with an image data structure for the captured image, for example, in header information or the associated camera setting may be stored as a separate data structure that can be linked to the image data structure. The camera settings may then be transferred with and/or stored with the captured image. It is favorable for the post-processing of the image content that camera settings applied during the time of capture t0,t1,t2,t3 are recorded accurately for each image. The image size, cropping and other image capture related settings are stored in a format that has common reference parameters enabling the comparison of camera settings between multiple captured images.

Figure 2:
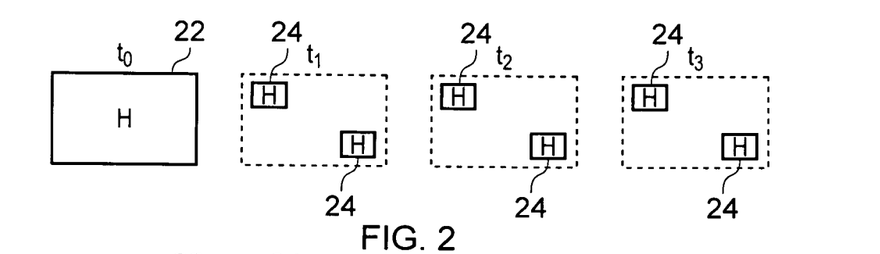
FIG. 2 illustrates an example of a sequence of captured images including a wide-field-of-view image and several narrow-field-of-view images.
Figure 3:
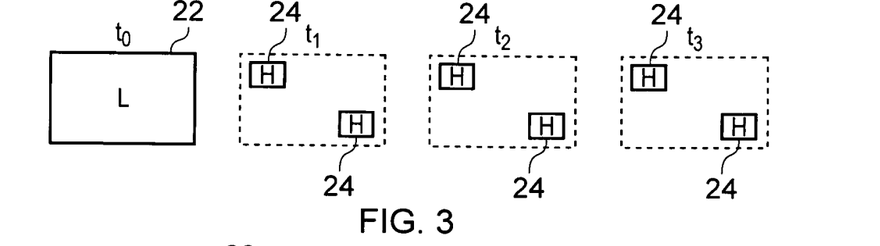
FIG. 3 illustrates another example of a sequence of captured images including a wide-field-of-view image and several narrow-field-of-view images.

In both FIGS. 2 and 3, a sequence of captured images is illustrated.

Each sequence comprises capture, at time t0, of a wide-field-of-view image 22 of the scene 20 and sequential capture at times t1, t2, t3 of different narrow-field-of-view images 24 of the scene 20.

At t0, the image sensor 3 is controlled to capture using a relatively wide field of view, a single wide-field-of-view image 24 of the scene 20.

At t1, the image sensor 3 is controlled to capture simultaneously, using a relatively narrow field of view or narrow fields of view, multiple narrow-field-of-view images 24 of the corresponding multiple portions 26 of the scene 20.

This simultaneous narrow field of view capture is repeated at time t2 where the same portions 26 of the scene 20 are captured simultaneously, using the same relatively narrow field of view or narrow fields of view, to provide, for time t2, multiple narrow-field-of-view images 24 of the corresponding multiple portions 26 of the scene 20. The same portions 26 of the scene 20 may be captured simultaneously at time t2 (with the same focus setting or different focus setting) as were captured simultaneously at time t1.

This simultaneous narrow field of view capture is repeated at time t3 where the same portions 26 of the scene 20 are captured simultaneously, using the same relatively narrow field of view or narrow fields of view, to provide, for time t3, multiple narrow-field-of-view images 24 of the corresponding multiple portions 26 of the scene 20. The same portions 26 of the scene 20 may be captured simultaneously at time t3 (with the same or different focus settings) as were simultaneously captured at times t1 and t2.

Thus in this example, each portion 26 of the scene 20 is captured at times t1, t2, t3 with the same field of view and with the same or a different focus setting. If different focus settings are used, then they may all be different to the focus setting used, at time t0, to capture the wide-field-of-view images 22 or there may be a common setting. It may be possible to vary other camera settings such as exposure or intensity of a flash over the sequence of image captures at t0 to t3.

During the period of time (t1-t3), the image sensor 3 is controlled to capture exclusively at a relatively narrow field of view or narrow fields of view, multiple different narrow-field-of-view images 24. That is during this period the image sensor is controlled not to capture, at a relatively wide field of view, a wide-field-of-view image 22 of a scene 20.

Although these Figures disclose at each time t1, t2, t3 the capture of two narrow-field-of-view images 24, it should be appreciated that more or less narrow-field-of-view images 24 may be captured. Each narrow-field-of-view image 24 is associated with a single portion 26 of the scene 20

At each time t1, t2, t3 the same number of narrow-field-of-view images 24 may be captured.

At each time t1, t2, t3 the field of view used to capture narrow-field-of-view images 24 for the same portion 26 of the scene may remain constant (fixed).

The field of view used to capture narrow-field-of-view images 24 for different portions 26 of the scene may be different.

The time period between times t0, t1, t2 and t3 may be the same.

In this illustrated example, the image sensor 3 is controlled to capture using exclusively a relatively wide field of view (t0) and is then controlled to capture using exclusively a narrow field(s) of view (t1-t3)

During the period of capture using exclusively a relatively wide field of view, the image sensor 3 is controlled to perform n separate capture events separated in time by a time Tn. At each capture event, the image sensor 3 is controlled to capture using a relatively wide field of view, a single wide-field-of-view image 24 of the scene 20. In the illustrated example n=1, however, in other embodiments n may be varied and have a different value.

During the period of capture using exclusively relatively narrow field(s) of view, the image sensor 3 is controlled to perform m separate capture events separated in time by a time Tm. At each capture event, the image sensor 3 is controlled to capture simultaneously, using a relatively narrow field of view or narrow fields of view, multiple narrow-field-of-view images 24 of the corresponding multiple portions 26 of the scene 20. In the illustrated example m=3, however, in other embodiments m may be varied and have a different value. The values of Tn and Tm may be the same or they may be different.

The rate of capture events at the wide field of view can be expressed as n/(n*Tn+m*Tm). The rate of capture events at the narrow field of view can be expressed as m/(n*Tn+m*Tm). The ratio of the rate of capture events at the wide field of view to the rate of capture events at the narrow field of view can be expressed as n/m. In the illustrated example, this ratio is 1/3.

In the illustrated example, the period of capture using exclusively a relatively wide field of view precedes the period of capture using exclusively a relatively narrow field(s) of view, however, the order may be reversed such that the period of capture using exclusively a relatively narrow field(s) of view precedes the period of capture using exclusively a relatively wide field of view.

In the illustrated example, a single cycle of the period of capture using exclusively a relatively wide field of view and the period of capture using exclusively a relatively narrow field(s) of view is illustrated. In some but not necessarily all embodiments, the cycle of the period of capture using exclusively a relatively wide field of view and the period of capture using exclusively a relatively narrow field(s) of view, may be repeated.

In some but not necessarily all embodiments, some parameters of the cycle remain the same when the cycle is repeated and some (or none) may be varied. Parameters of the cycle may, for example, include one or more of: spatial resolution, the position and/or size of the portions 26 of the scene 20, n, Tn, m, Tm, focus, etc.

Referring to FIG. 2, the one or more narrow-field-of-view images 24 and the wide-field-of-view image 22 have the same spatial resolution.

The wide-field-of-view image 22 has a relatively high spatial resolution H and the one or more narrow-field-of-view images 24 each has a relatively high spatial resolution H. They may, for example, have maximum spatial resolution.

Referring to FIG. 3, the one or more narrow-field-of-view images 24 and the wide-field-of-view image 22 have the different spatial resolution.

The wide-field-of-view image 22 has a relatively low spatial resolution L and the one or more narrow-field-of-view images 24 each has a relatively high spatial resolution H.

High spatial resolution may, for example, be maximum spatial resolution or greater than 50% of maximum resolution.

Low spatial resolution may, for example, be less than 50% of maximum spatial resolution.

Figure 4:
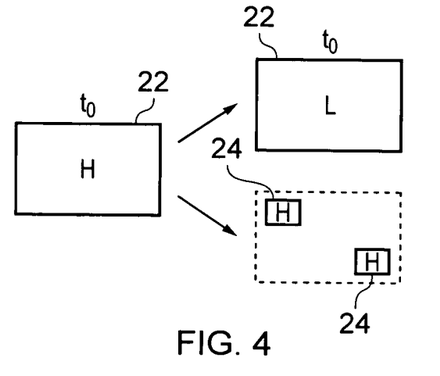
FIG. 4 illustrates an example of a method for forming a low spatial resolution wide-field-of-view image of a scene and one or more high spatial resolution narrow-field-of-view images of portions of the scene from an original high spatial resolution, wide-field-of-view image of the scene.

Referring to FIG. 4, the Fig illustrates a method for forming a low spatial resolution (L), wide-field-of-view image 22 of a scene 20 and the one or more high spatial resolution (H) narrow-field-of-view images 24 of portions 26 of the scene from an original high spatial resolution (H), wide-field-of-view image 22 of the scene 20.

The original high spatial resolution (H), wide-field-of-view image 22 is processed (e.g. filtered) to obtain a derivative, low spatial resolution (L), wide-field-of-view image 22 of the scene 20.

The original high spatial resolution (H), wide-field-of-view image 22 is processed (e.g. cropped) to obtain one or more high spatial resolution, narrow-field-of-view images 24.

Referring back to FIG. 1, the block 12, requires selection of portion(s) 26 of a scene 20. These portions 26 are captured at block 16 using a narrow field(s) of view.

The selection may, for example, be performed manually by a user. As an example, a wide field of view image of the scene 20 may be presented on a viewfinder display. The user may be able to select a portion 26 on the display by selecting a photographic element in the scene 20 or by forming a window around a portion of the scene. If the display viewfinder is a touch sensitive display, selection of a photographic element may occur by touching the display whereas a window may be formed by tracing a rectangle on the display. It may be possible to move and re-size the window.

The selection may, for example, be performed semi-automatically. As described in the preceding paragraph, the user may select a portion of the scene, however, the user-selected portion may be a putative portion. The image of the scene 20 may be analyzed to re-position and/or re-size the putative portion and define the portion 26 used for defining which narrow-field-of-view images are captured.

Alternatively, the selection may, for example, be automatic. For example, the image of the scene may be processed to select automatically the one or more portions 26 of a scene 20. As an example, a face recognition algorithm may be used to select portions of the image that correspond to human faces. As another alternative, time separated, low spatial resolution images of the scene 20 may be processed to select automatically the one or more portions 26 of a scene 20 that have changed between the images. A window may be defined for each portion. If windows are clustered, they may be combined to form a larger window or if they overlap they may be re-sized so that they do not overlap. The window may in some but not necessarily all embodiment be displayed on a display of a viewfinder and the user may be able to remove, add, re-position and re-size the windows.

Figure 5:
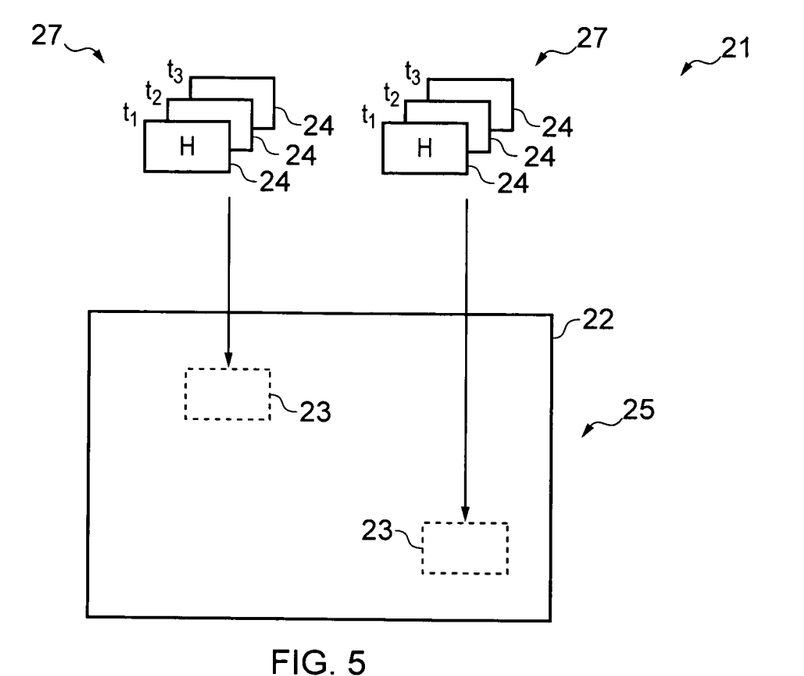
FIG. 5 illustrates an example of a method for forming a composite image.

FIG. 5 illustrates an example of a method 21 for forming a composite image 25. A composite image 25 of the scene 20 is formed using a wide-field-of-view image 22 and one or more narrow-field-of-view images 24.

Each of one or more parts 23 of the wide-field-of-view image 22 corresponding to the one or more portions 26 of the scene 20 are replaced with the corresponding one or more narrow-field-of-view images 24.

The process of replacement may utilize camera settings associated with a narrow-field-of-view image, if any. The process of replacement may utilize camera settings associated with the wide-field-of-view image, if any.

The method 21 enables independent selection, for each part 23 (portion 26), of which narrow-field-of-view image(s) 24 are used in forming the composite image 25.

In some but not necessarily all embodiments, the selection is performed by a user. As an example, the set of multiple different narrow-field-of-view images 24 in a set 27 may be presented as a separate menu for each portion 26 of the scene (part 23 of the wide-field-of-view image 22). The user can select from the menu for a part 23, one or more narrow-field-of-view images 24 in the set 27 for replacing that part 23 of the wide-field-of-view image 22 in the composite image 25.

In other embodiments, the selection is performed automatically. Algorithms may be used to select a 'best' one or more narrow-field-of-view images 24 in the set 27 for replacing a part 23 of the wide-field-of-view image 22 in the composite image 25. An example of one algorithm is a face recognition algorithm that is programmed to score narrow-field-of-view images 24 of faces by increasing a score when a smile is present and decreasing the score if one or more eyes are closed. The algorithm then selects, for each part 23, the highest scoring narrow-field-of-view image 24. Another example of an algorithm is one that determines which of the available narrow-field-of-view images 24 is sharpest (has the best focus). This may be achieved, for example, by using a filter to identify interest points and selecting the narrow-field-of-view images 24 that has most interest points.

In some but not necessarily all embodiments, one of the of the multiple different narrow-field-of-view images 24 in the set 27 may be selected by a user to form the composite image 25. Thus the narrow-field-of-view image used to correspond to a first portion of the scene 20, when forming the composite image, may have been captured at a first time and the narrow-field-of-view image used to correspond to a second portion of the scene 20, when forming the composite image, may have been captured at a second different time.

In other embodiments, a sequence of the of the multiple different narrow-field-of-view images 24 in the set 27 may be selected by a user to form the composite image 25. Each selected sequence of multiple different narrow-field-of-view images 24 in the set 27 is run as a local video sequence within the wide-field-of-view images 22. This forms a cinemagraph.

Thus a sequence of narrow-field-of-view images used for a video at a first portion of the scene 20 in the composite image, may have been captured over a first time and the sequence of narrow-field-of-view images used for a video at a second portion of the scene 20 in the composite image 25 may have been captured over a second different time.

Also, a sequence of narrow-field-of-view images used for a video at a first portion of the scene 20 in the composite image, may have been captured over a first time and a narrow-field-of-view image used for a second portion of the scene 20 in the composite image 25 may have been captured at a second different time or during the first time.

Figure 6:
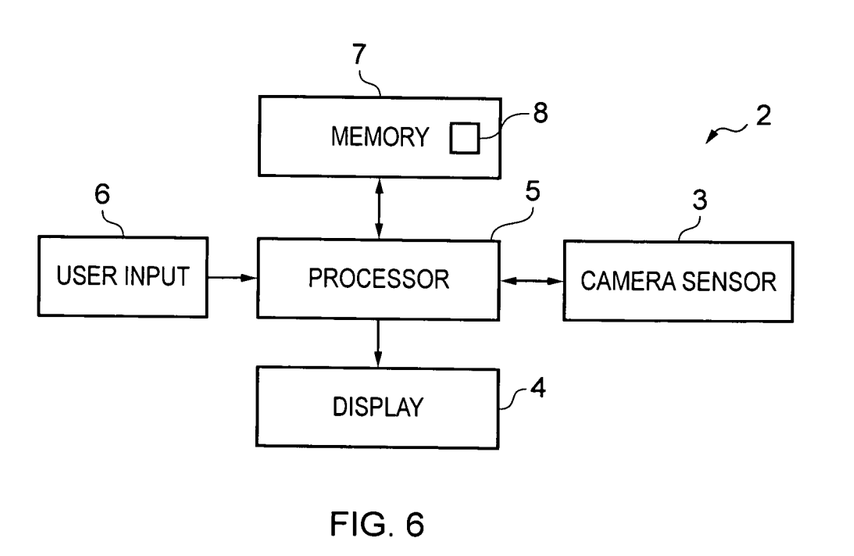
FIG. 6 illustrates an example of an apparatus 2.

FIG. 6 illustrates an example of an apparatus 2.

In this example, the apparatus comprises a controller 9, a user input 6, an image sensor 3 and a display 4.

The controller 9 is configured to received input commands from the user input device 6 and provide output commands to the display 4. In some embodiments, the user input 6 and the display 4 may be combined as a touch sensitive display. The display 4 may be used as a viewfinder.

The controller 9 is also configured to communicate with the image sensor 3.

The controller 9 is configured to send commands to the image sensor 3 that control the capturing of an image by the image sensor 3.

Capturing an image may comprise creating a data structure recording the image and sending the data structure to the controller 9. The controller 9 may be configured to store in a memory, for subsequent retrieval by the controller 9, the data structure. A wide-field-of-view data structure may record a wide-field-of-view image 22 and a narrow-field-of-view data structure may record a narrow-field-of-view image 24.

The controller 9 may also control settings of the image sensor 3 such as focus, spatial resolution, n, Tn, m, Tm, the position and size of the portions 26 of the scene (e.g. definitions of the field of view for the narrow-field-of-view images 24).

The apparatus 2 may be any device that is capable of processing images. The apparatus 2 may or may not comprise the image sensor 3, user input 6 and display 4. It may, for example, be a module for integration into a host electronic device that comprises those components.

The apparatus 2 may be an electronic device. It may be a hand-portable electronic device. A hand-portable electronic device is an electronic device that is sized to be held in a human hand when in use and is sized to fit in an inside pocket of a jacket.

Implementation of controller 9 can be in hardware alone (a circuit, a processor etc), have certain aspects in software including firmware alone or can be a combination of hardware and software (including firmware).

The controller 9 may be implemented using instructions that enable hardware functionality, for example, by using executable computer program instructions in a general-purpose or special-purpose processor that may be stored on a computer readable storage medium (disk, memory etc) to be executed by such a processor.

In FIG. 6, the example of a controller 9 comprises a processor 5 that is configured to read from and write to the memory 7. The processor 5 may also comprise an output interface via which data and/or commands are output by the processor and an input interface via which data and/or commands are input to the processor 5.

The memory 7 stores a computer program 8 comprising computer program instructions that control the operation of the controller 9 when loaded into the processor 5. The computer program instructions 8 provide the logic and routines that enables the apparatus to perform the methods illustrated in the Figs and described in the preceding paragraphs. The processor 5 by reading the memory 7 is able to load and execute the computer program 8.

The apparatus 2 may therefore comprise: at least one processor 5; and at least one memory 7 including computer program code 8 the at least one memory 7 and the computer program code 8 configured to, with the at least one processor 5, cause the apparatus 2 at least to perform:

selection of one or more portions 26 of a scene 20;

control of the image sensor 3 to capture, at a relatively wide field of view, a wide-field-of-view image 22 of the scene 20; and control of the image sensor 3 to capture, at a relatively narrow field of view or narrow fields of view, one or more narrow-field-of-view images 24 of the one or more portions 26 of the scene 20.

The apparatus 2 may therefore comprise: at least one processor 5; and at least one memory 7 including computer program code 8 the at least one memory 7 and the computer program code 8 configured to, with the at least one processor 5, cause the apparatus 2 at least to perform:

receiving the wide-field-of-view image 22;

receiving the one or more narrow-field-of-view images 24;

forming a composite image 25 of the scene 20 with the relatively wide field of view using the wide-field-of-view image 22 and the one or more narrow-field-of-view images 24.

Figure 7:
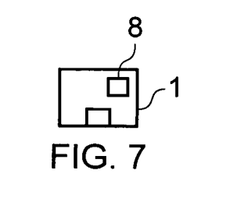
FIG. 7 illustrates an example of a record medium embodying a computer program.

Referring to FIG. 7, the computer program 8 may arrive at the apparatus 2 via any suitable delivery mechanism 1. The delivery mechanism 1 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 8. The delivery mechanism may be a signal configured to reliably transfer the computer program 8. The apparatus 2 may propagate or transmit the computer program 8 as a computer data signal.

Although the memory 7 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a base band integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user.

The blocks illustrated in the FIG. 1 may represent stages in a method and/or sections of code in the computer program 8. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   selecting one or more portions of a scene;
   controlling an image sensor to capture, at a first time, at an array of sensor elements, at a relatively wide field of view, a wide-field-of-view image of the scene; and
   controlling the image sensor to capture, later than the first time, at one or more subsets of the array of sensor elements, at a relatively narrow field of view or narrow fields of view, one or more narrow-field-of-view images of the one or more selected portions of the scene, wherein the one or more subsets of the array of sensor elements overlaps the array, and wherein the one or more subsets of the array of sensor elements comprises fewer than all of the sensor elements of the array.

2. A method as claimed in claim 1, comprising: controlling the image sensor to capture simultaneously one or more narrow-field-of-view images of the one or more portions of the scene.

3. A method as claimed in claim 1, comprising: controlling the image sensor to capture, at different camera settings and/or spatial resolutions, the one or more narrow-field-of-view images and the wide-field-of-view image of a scene.

4. A method as claimed in claim 3, wherein the camera settings are selected from the group comprising: focus; spatial resolution; and rate of repeated capture.

5. A method as claimed in claim 1 comprising: controlling the image sensor to capture repeatedly, at a relatively narrow field of view or narrow fields of view, one or more narrow-field-of-view images of the one or more portions of the scene.

6. A method as claimed in claim 1 comprising: controlling the image sensor to capture repeatedly at a first rate, using a relatively wide field of view, wide-field-of-view images of the scene; and controlling the image sensor to capture repeatedly at a second rate, using a relatively narrow field of view or narrow fields of view, narrow-field-of-view images of the one or more portions of the scene.

7. A method as claimed in claim 6, processing time separated, low spatial resolution images of the scene to select automatically the one or more portions of a scene that vary in time.

8. A method as claimed in claim 1, comprising:
receiving the wide-field-of-view image;
receiving the one or more narrow-field-of-view images;
forming by a processor a composite image of the scene with the relatively wide field of view using the wide-field-of-view image and the one or more narrow-field-of-view images.

9. A method as claimed in claim 8, comprising forming by the processor the composite image of the scene with the relatively wide field of view by replacing one or more parts of the wide-field-of-view image corresponding to one or more portions of the scene with one or more narrow-field-of-view images.

10. A method as claimed in claim 8, comprising: enabling selection of a first narrow-field-of-view image corresponding to a first portion of the scene captured at a first time for use in forming the composite image; and enabling selection of a second narrow-field-of-view image corresponding to a second different portion of the scene captured at a second different time for use in forming the composite image.

11. A method as claimed in claim 8, comprising: forming by a processor a composite image of the scene with the relatively wide field of view by replacing one or more parts of the wide-field-of-view image corresponding to the one or more portions of the scene with a sequence of corresponding narrow-field-of-view images.

12. A method as claimed in claim 1, wherein selecting one or more portions of the scene comprises controlling a position and size of the one or more subsets.

13. An apparatus comprising:
at least one processor; and
at least one memory including computer program code
the at least one memory and the computer program code configured to, with the at least one processor, cause the apparatus at least to perform:
selection of one or more portions of a scene;
control of an image sensor to capture, at a first time, at an array of sensor elements, at a relatively wide field of view, a wide-field-of-view image of a scene;
control of the image sensor to capture, later than the first time, at one or more subsets of the array of sensor elements, at a relatively narrow field of view or narrow fields of view, one or more narrow-field-of-view images of the one or more portions of the scene, wherein the one or more subsets of the array of sensor elements overlap the array, and wherein the one or more subsets of the array of sensor elements comprises fewer than all of the sensor elements of the array.

14. An apparatus as claimed in claim 13, comprising the image sensor wherein the at least one memory and the computer program code are configured to, with the at least one processor, cause the apparatus at least to perform:
controlling the image sensor to capture, at different camera settings, the one or more narrow-field-of-view images and the wide-field-of-view image of a scene.

15. An apparatus as claimed in claim 14, wherein at least some of the camera settings used to captured a narrow-field-of-view image are associated with the narrow-field-of-view image to assist subsequent processing.

16. An apparatus as claimed in claim 13, wherein the at least one memory and the computer program code are configured to, with the at least one processor, cause the apparatus at least to perform:
controlling the image sensor to capture repeatedly during a first period of time, exclusively at a relatively narrow field of view or narrow fields of view, one or more narrow-field-of-view images of the one or more portions of the scene, the image sensor being controlled during the first period of time not to capture, at a relatively wide field of view, a wide-field-of-view image of a scene.

17. An apparatus as claimed in claim 13, wherein the at least one memory and the computer program code are configured to, with the at least one processor, cause the apparatus at least to perform:
controlling the image sensor to capture repeatedly at a first rate, using a relatively wide field of view, wide-field-of-view images of the scene; and
controlling the image sensor to capture repeatedly at a second rate, using a relatively narrow field of view or narrow fields of view, narrow-field-of-view images of the one or more portions of the scene.

18. An apparatus as claimed in claim 13, wherein the at least one memory and the computer program code are configured to, with the at least one processor, cause the apparatus at least to perform;
controlling the image sensor to capture repeatedly, at a relatively narrow field of view, multiple narrow-field-of-view images with different focus.

19. An apparatus as claimed in claim 13, wherein the at least one memory and the computer program code are configured to, with the at least one processor, cause the apparatus at least to perform:
forming a composite image of the scene with the relatively wide field of view using the wide-field-of-view image and the one or more narrow-field-of-view images.

20. An apparatus as claimed in claim 19, wherein forming the composite image of the scene with the relatively wide field of view comprises replacing one or more parts of the wide-field-of-view image corresponding to the one or more portions of the scene with a sequence of corresponding narrow-field-of-view images.

21. An apparatus as claimed in claim 19, wherein the at least one memory and the computer program code are configured to, with the at least one processor, cause the apparatus at least to perform:
enabling selection of a first narrow-field-of-view image corresponding to a first portion of the scene captured at a first time for use in forming the composite image; and
enabling selection of a second narrow-field-of-view image corresponding to a second different portion of the scene captured at a second different time for use in forming the composite image.

22. An apparatus as claimed in claim 13, configured as a hand-portable electronic device and/or configured as a module for integration into an electronic device.

23. A method comprising:
selecting one or more portions of a scene;

storing in a memory for subsequent retrieval a wide-field-of-view data structure recording an image of the scene captured at a relatively wide field of view;

storing in a memory for subsequent retrieval one or more narrow-field-of-view data structures recording one or more images restricted to the one or more portions of the scene;

receiving an original wide-field-of-view data structure recording, at a relatively high spatial resolution, an image of a scene captured at a relatively wide field of view;

processing the original wide-field-of-view data structure to obtain a derivative wide-field-of-view data structure recording, at a relatively lower spatial resolution than the spatial resolution of the original wide-field-of-view data structure spatial resolution, an image of the scene captured at a relatively wide field of view; and processing the original wide-field-of-view data structure to obtain the one or more narrow-field-of-view data structures recording one or more images restricted to one or more portions of the scene.

24. A method as claimed in claim 23, wherein processing the original wide-field-of-view data structure to obtain the one or more narrow-field-of-view data structures comprises cropping the original wide-field-of-view data structure.

* * * * *